United States Patent
Kilmer et al.

(10) Patent No.: US 6,732,291 B1
(45) Date of Patent: May 4, 2004

(54) HIGH PERFORMANCE FAULT TOLERANT MEMORY SYSTEM UTILIZING GREATER THAN FOUR-BIT DATA WORD MEMORY ARRAYS

(75) Inventors: Charles Arthur Kilmer, Essex Junction, VT (US); Shanker Singh, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 548 days.

(21) Appl. No.: 09/716,913

(22) Filed: Nov. 20, 2000

(51) Int. Cl.[7] ................................................ G06F 11/00
(52) U.S. Cl. ................................ 714/7; 711/133
(58) Field of Search .......................... 714/7, 6, 8, 13, 714/25, 26, 42, 44, 27; 711/133, 159

(56) References Cited

U.S. PATENT DOCUMENTS

| | | | |
|---|---|---|---|
| 5,184,325 A | | 2/1993 | Lipovski |
| 5,267,242 A | | 11/1993 | Lavallee et al. |
| 5,291,498 A | * | 3/1994 | Jackson et al. ............. 714/758 |
| 5,528,553 A | * | 6/1996 | Saxena ................... 365/230.01 |
| 5,751,744 A | * | 5/1998 | Babb .......................... 714/800 |
| 5,845,059 A | * | 12/1998 | McClure ...................... 714/27 |
| 5,886,930 A | * | 3/1999 | Maclellan et al. ...... 365/189.05 |
| 5,917,838 A | * | 6/1999 | Wardrop ..................... 714/767 |
| 5,940,874 A | | 8/1999 | Fulcomer |
| 6,085,334 A | * | 7/2000 | Giles et al. ..................... 714/7 |

OTHER PUBLICATIONS

"ECC System Using Two Related Check Matrices"; *IBM Technical Disclosure Bulletin*, Aug. 1982, vol. 25, No. 3A.

* cited by examiner

Primary Examiner—Nadeem Iqbal
(74) Attorney, Agent, or Firm—Randall J. Bluestone; Bracewell & Patterson, L.L.P.

(57) ABSTRACT

A method for providing a fault tolerant memory system having a number of memory arrays that includes at least one spare memory array and utilizing a data word organization of greater than 4 bits. The method includes detecting a multi-bit word error in a memory array. In an advantageous embodiment, a single package detect (SPD) logic, for detecting a package error of 1–4 bits, is utilized to identify the failed memory array. Next, the content of a first row of cells in the failed memory array is read and a first complement of the content is generated. Subsequently, the first complement is written back to the first row of cells in the failed array. A second read operation is then initiated to retrieve the first complement from the failed memory array, following which, a second complement of the first complement is generated. The second complement is then written to a corresponding first row of cells in the spare memory array and the method is repeated for all row of cells in the failed memory array. The method further includes replacing the failed memory array with the spare memory array for future READ/WRITE operations by comparing the address of the failed memory array with a memory array address of a READ/WRITE operation and directing the READ/WRITE operation to the spare memory array in the event that the addresses are equal.

19 Claims, 4 Drawing Sheets

HIGH PERFORMANCE FAULT TOLERANT MEMORY SYSTEM UTILIZING GREATER THAN FOUR-BIT DATA WORD MEMORY ARRAYS

BACKGROUND OF THE INVENTION

1. Technical Field

The present invention relates in general to memory configurations for computing systems, and in particular to fault detection and correction. More specifically, the present invention relates to a method and system for providing a high performance fault tolerant memory system utilizing greater than four-bit data word memory arrays.

2. Description of the Related Art

Memory systems employed in conventional data processing systems, such as computer systems, typically include large arrays of physical memory cells that are utilized to store information in a binary manner. Generally in a conventional memory system, all of the memory cells on a memory chip are disposed in one or more memory arrays having a set number of rows and columns. Operatively, the rows are selected by row decoders that are typically located adjacent to the ends of the row lines. Each of the row lines is electrically connected to the row decoders so that the appropriate signals can be received and transmitted.

The columns of the memory array are connected to input/output (I/O) through column decode devices. In the case of dynamic random access memories (DRAMs), the memory array columns are also connected to line precharging circuits and sense amplifiers at the end of each column line to periodically sense amplify and restore data in the memory cells.

There are two kinds of errors that can typically occur in a memory system, soft errors and hard errors. A soft error is a seemingly random inversion of stored data. This inversion may be caused by occasional electrical noise, environmental conditions and, in some cases, by bombardment of radioactive particles, the so-called alpha particle event. The soft error problem has increased as the individual cell sizes of the memory arrays have been reduced increasing their susceptibility to relatively low amounts of noise. Although soft error failure rates are generally 2–3 times the order of magnitude higher than hard error failure rates in DRAM arrays, soft error failures typically only cause single bit errors in memory system words. A hard error, in contrast, represents a permanent electrical failure of the memory array, often restricted to particular memory locations but may also sometimes associated with peripheral circuitry of the memory array so that the entire array can be affected. Naturally, designers of memory arrays have strived to reduce the occurrence of both hard and soft errors in their memory arrays. However, both types of errors have not been completely eliminated and, indeed, it is not believed that they can be eliminated. Designing to achieve high reliability beyond a certain point can be done only at the expense of reduced performance and increased cost.

One solution for detecting and correcting both hard and soft errors has been the implementation of error correction codes (ECC) in large computer memories. The fundamentals of error detecting and correcting are described by R. W. Hamming in a technical article entitled "Error Detecting and Error Correcting Codes" appearing in the Bell System Technical Journal, Volume 26, No. 2, 1950 at pages 147–160. Utilizing one of the most popular Hamming codes, an 8 bit data word is encoded to a 13-bit word according to a selected Hamming code. A decoder can process the 13-bit word and correct any 1 bit error in the 13 bits and can detect if there are 2-bit errors. The described code, thus, is classified as SEC/DED (single error correct/double error detect). The use of such codes has been particularly efficient for memory arrays having single-bit outputs. For instance, if a relatively simple computer were to have 16K (16,348) bytes of data where each byte contains 8 data bits, an efficient error-protected design would utilize thirteen 16K×1 memory arrays with the extra five 16K memory arrays providing a Hamming SEC/DED protection. The Hamming code not only can correct a single bit hard or soft random error occurring in any byte, but can also further correct any one failed 16K memory array since any one memory array contributes only 1 bit per each error-protected word.

The above-described 13-bit Hamming code can only correct one error, whether it be a hard error or a soft error. Consequently, if one memory array has suffered a hard failure in all its locations, then the remaining memory arrays are not protected against an occasional soft error although it could be detected but not corrected. To be able to detect and correct more than one error, more elaborate error correcting codes have been developed and implemented. However, as a general rule, the more errors that can be corrected in a word, the more extra check bits are required by the check code.

Presently, memory arrays typically contain 256 Mbit devices and the trend is towards production of memory arrays that will contain 1 Gbit within two to four years. With the anticipated increase in memory array sizes, the present approach of utilizing 1 or 4 bit wide memory chip organization must be reconsidered. For example, employing the present 1 or 4 bit memory chip organization with a 32 bit wide data word will require 32 memory arrays (1 bit organization) or 8 memory arrays (4 bit organization). This will, in turn, result in a minimum granularity in, e.g., a personal computer (PC), of 8 GB or 2 GB, respectively. This large amount of memory in a desktop or laptop computer is excessive and also has the added disadvantage of increasing the overall cost of the computer system. In response to the minimum granularity problem, memory array manufacturers are moving to 8, 16 and even 32 bit wide memory organization schemes with the corresponding increase in the number of check bits required for error detection and correction.

Unfortunately, Hamming codes require several check bits to accomplish the error detection and correction. As discussed above, an eight-bit data word requires five check bits to detect two-bit errors and correct one-bit errors. As the bus grows wider and the number of bits of transmitted data increases, the number of check bits required also increases. Because modern memory buses are often 64 or 128 bits wide, the associated Hamming code would require substantially more check bits and increasing levels of logic circuits to implement the error correction code. Consequently, using powerful Hamming codes in large memory systems is expensive and consumes substantial memory resources. Additionally, these designs will result in slower memory access time due to the increasing number of logic circuits and logic levels necessary to implement the support and error correction code.

Accordingly, what is needed in the art is an improved error detection and correction scheme that mitigates the above-described limitations in the prior art. More particularly, what is needed in the art is a high performance fault tolerant memory system utilizing memory arrays organized to provide greater than four-bits.

SUMMARY OF THE INVENTION

It is therefore an object of the invention to provide an improved memory system.

It is another object of the invention to provide a fault tolerant memory system utilizing greater than four bit data word memory arrays.

To achieve the foregoing objects, and in accordance with the invention as embodied and broadly described herein, a method for providing a fault tolerant memory system having a number of memory arrays that includes at least one spare memory array and utilizing a data word organization of greater than 4 bits is disclosed. The method includes detecting a multi-bit word error in a memory array. In one advantageous embodiment, a single package detect (SPD) logic, for detecting a package error of 1–4 bits, is utilized to identify the failed memory array. Next, the content of a first row of cells in the failed memory array is read and a first complement of the content is generated. Subsequently, the first complement is written back to the first row of cells in the failed array. A second read operation is then initiated to retrieve the first complement from the failed memory array, following which, a second complement of the first complement is generated. The second complement is then written to a corresponding first row of cells in the spare memory array and the method is repeated for all row of cells in the failed memory array. The method further includes replacing the failed memory array with the spare memory array for future READ/WRITE operations by comparing the address of the failed memory array with a memory array address of a READ/WRITE operation and directing the READ/WRITE operation to the spare memory array in the event that the addresses are equal.

The present invention discloses a novel fault tolerant memory system utilizing SEC/DED/SPD codes, along with a READ/COMPLEMENT/WRITE/COMPLEMENT data restoration process to reconstruct and provide corrected data to data processing systems utilizing the fault tolerant memory system. The present invention further provides means for automatically replacing failed memory arrays with inplace spare memory arrays. The utilization of the SEC code in the present in the present invention is primarily to correct the more frequently occurring single bit soft errors that are non-repeatable, unlike hard errors. The hard errors are resolved within the context of the present invention utilizing automatic memory array sparing and data reconstruction techniques such as the READ/COMPLEMENT/ WRITE/COMPLEMENT process. The present invention utilizes memory arrays organized with greater than four bits to take advantage of the anticipated memory arrays that will commonly available in future memory array technologies. The memory system of the present invention may be advantageous utilized in providing cost-effective large memory subsystems particularly required for high performance and highly reliable systems such as servers.

The foregoing description has outlined, rather broadly, preferred and alternative features of the present invention so that those skilled in the art may better understand the detailed description of the invention that follows. Additional features of the invention will be described hereinafter that form the subject matter of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
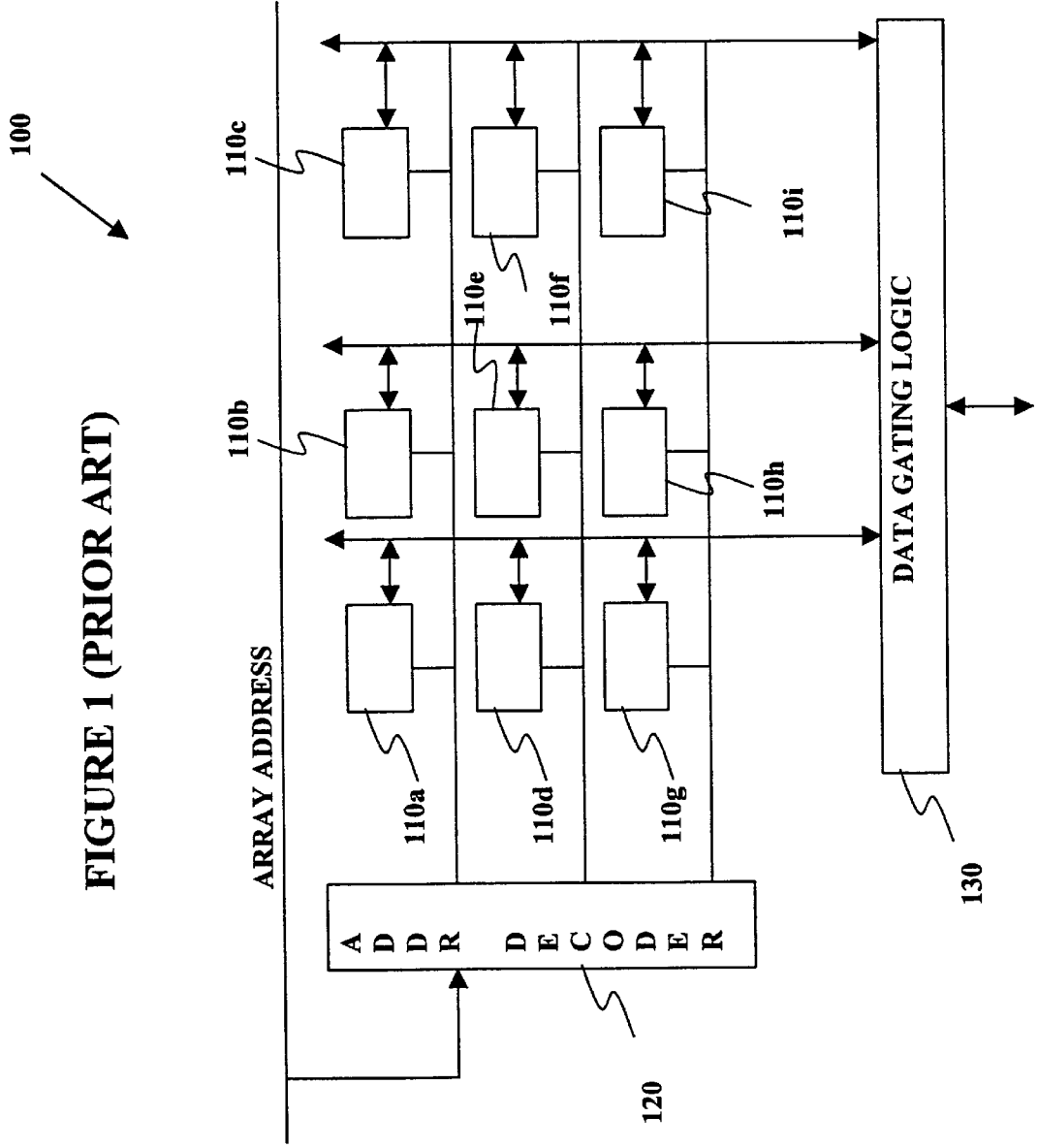
FIG. 1 illustrates an exemplary high-level simplified block diagram of a memory system that provides a suitable environment for the practice of the present invention.

With reference now to the figures, and in particular, with reference to FIG. 1, there is depicted an exemplary high-level simplified block diagram of a memory system 100 that provides a suitable environment for the practice of the present invention. Memory system 100 includes a plurality of memory arrays, generally designated 110a–110i, that are coupled to a corresponding address decoder 120 that is utilized to selectively couple a desired stored data word location identified by a specific row and column in memory arrays 110a–110i to a data gating logic 130. Memory arrays 110a–110i, in a preferred embodiment, are dynamic random access memories (DRAMs). Alternatively, the memory arrays may be static random access memories (SRAMs) or alternative technologies. In an advantageous embodiment, memory system 100 is part of a data processing system, such as a personal computer (PC).

Generally, memory system 100 receives three external signals: one clock (not shown) and two commands, i.e., READ and WRITE. Memory system 100 also receives a multi-bit address signal at address decoder 120 and may, for example, generate a multiple bit output at data gating logic 130 at every ins clock cycle (assuming a gigahertz clock is utilized). The address of a data word to be read, or alternatively written, is received at address decoder 120 that, in turn, generates the corresponding row and column addresses in memory arrays 110a–110i. Data gating logic 130 generally contains all the logic circuits, such as a read/write multiplexer, for transferring the information stored in the memory arrays to a data in/out buffer (not shown).

Figure 2:
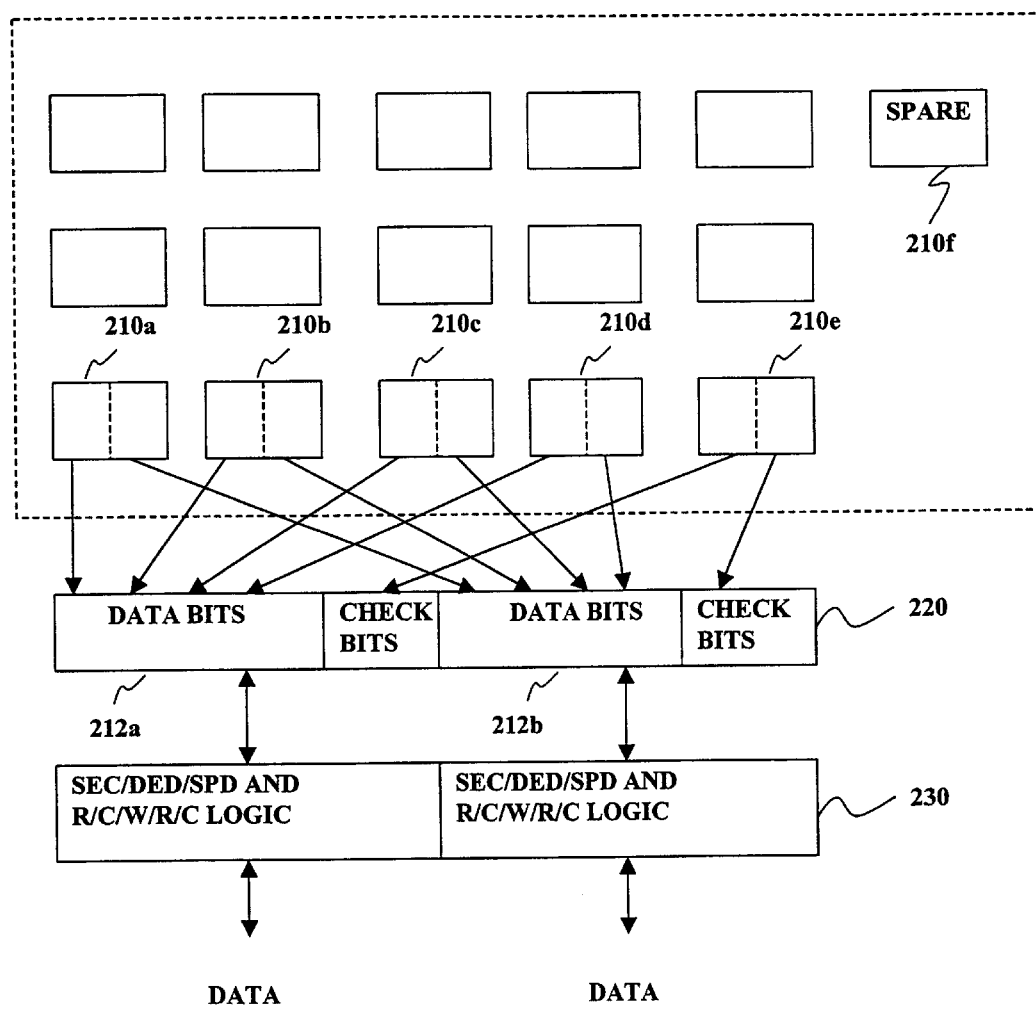
FIG. 2 illustrates a high-level block diagram of an embodiment of a memory subsystem according to the principles of the present invention.

Referring now to FIG. 2, there is illustrated a high-level block diagram of an embodiment of a memory subsystem 200 according to the principles of the present invention. Memory subsystem 200 includes a plurality of memory arrays, only first, second, third, fourth and fifth memory arrays 210a–210e and spare memory array 210f are identified and referenced for ease of explanation. In an advantageous embodiment, memory arrays 210a–210f are ×8 arrays and support a 16-bit data word organization. It should be noted that memory subsystem 200 is advantageously optimized utilizing memory arrays with greater than four bits organization, such as ×8, ×16 and ×32 memory arrays. In the illustrated embodiment, four bits from each of first, second, third and fourth memory arrays 210a, 210b, 210c, 210d are utilized to store a single 16-bit data word. As depicted, a first data word 212a utilizes the first four bits of each of first, second, third and fourth memory arrays 210a, 210b, 210c, 210d and a second data word 212b utilizes the remaining four bits in first, second, third and fourth memory arrays 210a, 210b, 210c, 210d. Fifth memory array 210e provides the respective check bits for first and second data words 212a, 212b. It should be noted that the practice of the present invention is not limited to any one particular data word organizational scheme, the present invention may be practiced with any data word organization that is greater than 4 bit wide.

First and second data words 212a, 212b, along with their respective check bits illustrate a conventional error correcting code (ECC) implementation that appends a number of check bits to each data word. The appended check bits are used by ECC logic circuits to detect errors within the data word. The simplest and most common form of error control is generally implemented with the use of a parity bit. A single parity bit is appended to a data word and assigned to be either a 0 or a 1, so as to make the number of 1's in the data word even in the case of even parity codes, or odd in the case of odd parity codes.

Prior to the transmission of the data word and often upon the initial storage of the data word, the value of the parity bit is computed at the source point and appended to the data word. Upon receipt of the transmitted data word, logic at a destination point recalculates the parity bit and compares it to the received, previously appended parity bit. If the recalculated and received parity bits are not equal, a single bit error has been detected. Specifically, this means that a single data bit in the data word has transitioned from its original value, for example, 1 to 0 or 0 to 1. If the received and recalculated parity bits are equal, then it can be concluded that such a single bit error did not occur, however multiple bit errors may not be ruled out. For example, if a data bit changes from a 0 to a 1 and another data bit changes from a 1 to a 0 (i.e. a double bit error) the parity of the data word will not change and the error will be undetected. Thus, use of the parity bit provides single error detection but fails to detect every multiple even bit error. Furthermore, the single parity bit scheme fails to provide information as to the location of the erroneous bit(s).

By appending additional parity bits, i.e., check bits, to the data word, each corresponding to a subset of data bits within the data word, the parity bit concept may be easily expanded to provide the detection of multiple bit errors or to determine the location of single or multiple bit errors. Once a data bit error is located, utilizing conventional correction schemes that are well known in the art, it is a simple matter to cause a logic circuit to correct the located erroneous bit, thereby providing single error correction (SEC). The popular conventional single error correction codes also have the ability to detect double errors in a memory system word and are thus termed single error correcting double error detecting (SEC/DED) codes. SEC/DED codes may be further enhanced by modifying the SEC/DED logic circuits to detect single package errors of 1–4 bits. The modified logic does hot require any more additional check bits than required by conventional SEC/DED codes and is commonly referred to as single error correct double error detect single package detect (SEC/DED/SPD) code. Furthermore, SEC/DED/SPD codes are as fast as SEC/DED codes. Utilizing SEC/DED/SPD codes allows a memory system to correct a single bit error, detect a double bit error and detect a package bit error (1–4 bits) in a system memory word.

The utilization of SEC/DED/SPD codes facilitates the use of four bit organized memory arrays without compromising system data integrity and yet maintains the fast memory access to data required by high performance systems, such as servers and workstations. The present invention extends the utilization of fast SEC/DED/SPD codes for memory arrays packaged to provide eight, sixteen or even thirty-two bits. The present invention, as shown in the illustrated embodiment, utilizes four bits from each memory array per system word. Thus, in the illustrated embodiment, two memory words are accessed in a buffer (not shown) even if the system only requires one of the two memory words. Additionally, each of first and second data words 212a, 212b, in an advantageous embodiment, is coupled to a dedicated SEC/DED/SPD logic. Generally, in the majority of cases, the system will require both words and, therefore, the illustrated memory system organization will allow for higher data rates to support higher performance processors utilized in, for example, server systems. It should also be noted that since memory subsystems designed for servers are large, memory granularity is less of a problem as compared to memory systems employed in, e.g., PCs and laptop computers.

The present invention not only allows the utilization of wide memory organization (greater than four bits), but also provides higher performance (memory access and data rates) and greater reliability. In the event that a memory array chip is completely "killed," the SPD code will still identify an error and protect the system from data integrity related problems. The SPD error signal is utilized by the system to determine if the failed memory array needs to be replaced by a spare memory array incorporated in the memory system of the present invention.

In the depicted embodiment, first or second data words 212a, 212b, along with their associated check bits, are routed to error detection and correction logic 230 (analogous to data gating logic depicted in FIG. 1) prior to being placed, for example, on a system bus (not shown). Error detection and correction logic 230 includes failure detection logic that, in an advantageous embodiment, utilizes conventional SEC/DED/SPD logic to detect errors in any transmitted data word, e.g., first or second data words 212a, 212b, within memory system 200. As discussed previously, the SEC/DED/SPD logic can only correct a single error, but its advantage within the context of the present invention is in its ability to detect the "failure" to a particular package, i.e., memory array. Also included within error detection and correction logic 230 is correction logic to implement a read-complement-write-read-complement (R/C/W/R/C) data word correction scheme. In an advantageous embodiment, the R/C/W/R/C correction scheme is implemented utilizing a logic circuit of inverters (not shown) to accomplish the complement operation.

To illustrate the operation of the R/C/W/R/C correction scheme, consider an eight bit data word W (for ease of explanation) stored in two memory arrays where the first four bits of the data word are stored in one memory array and the second four bits of the data word are stored in the second memory array. Additionally, the data word has incurred a multi-bit error, e.g., two bits within the data word are stuck faults. The SEC/DED/SPD logic will detect the presence of a failed memory array within a specific row of memory arrays. The R/C/W/R/C process described below and a compare of the first read and last read complemented word (if not all zeros) will identify the specific location of the failed memory array. Since there are more than one bit error, the SEC/DED/SPD logic will not be able to correct the errors. The R/C/W/R/C logic will then be utilized to restore the "corrupted" data word. For example, if the portion of the correct data word stored in the failed memory array should be "1 0 0 1" but the second and third bits are stuck at "1," the resulting content in the failed memory array will read "1 1 1 1." The restoration of the data word utilizing the R/C/W/R/C methodology is illustrated below in Table 1.

TABLE 1

| R/C/W/R/C Operation | |
|---|---|
| READ | 1 1 1 1 |
| COMPLEMENT | 0 0 0 0 |
| WRITE | 0 0 0 0 |
| READ | 0 1 1 0 |
| COMPLEMENT | 1 0 0 1 |

From the example detailed above in Table 1, it should be apparent that the R/C/W/R/C operation will result in the restoring the portion of the data word with the stuck bits to its correct form of "1 0 0 1." The operation of the present invention will hereinafter be described in greater detail with reference to FIGS. 3 and 4, with continuing reference to FIG. 2.

Figure 3:
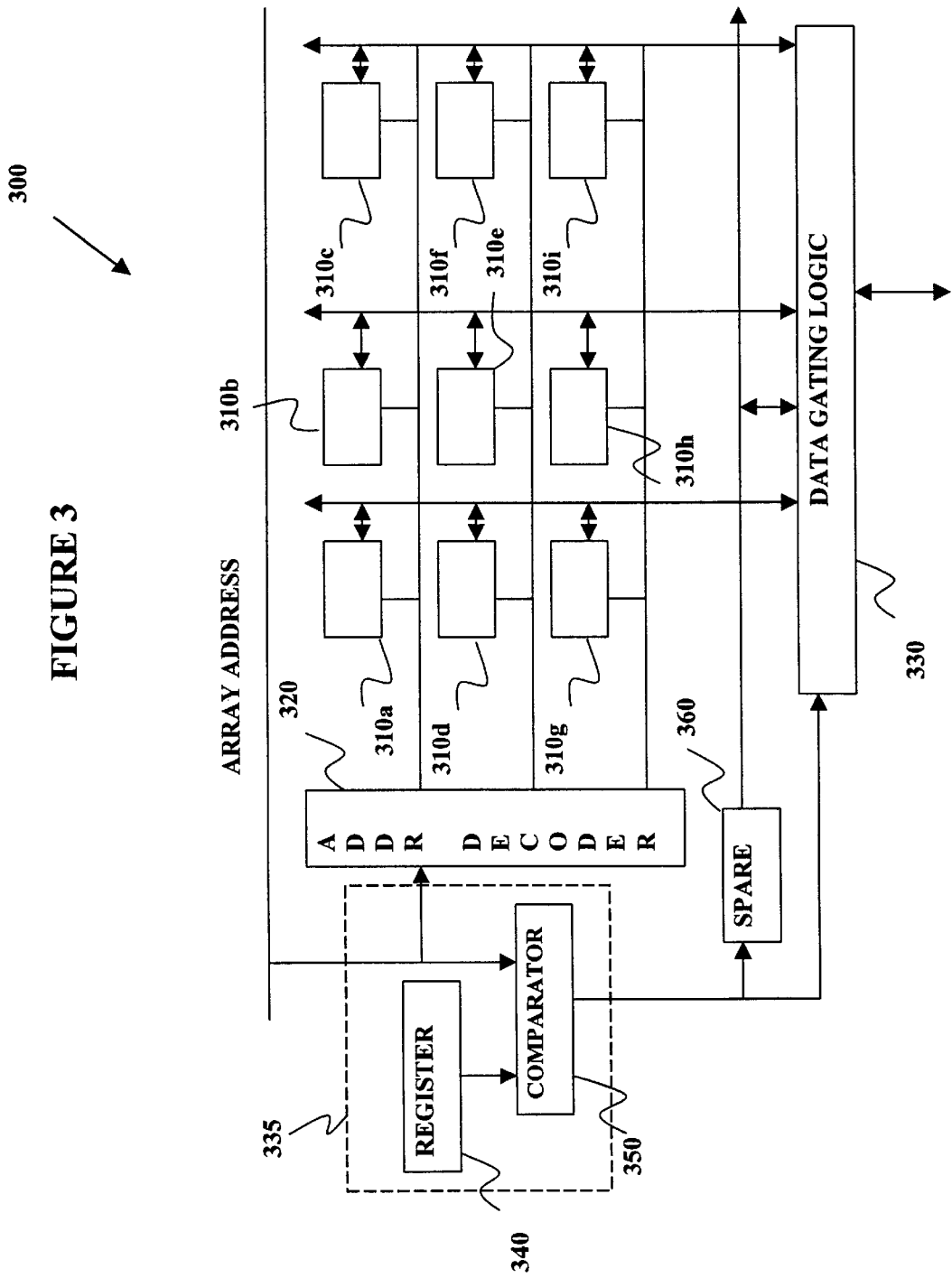
FIG. 3 illustrates a simplified block diagram of an embodiment of a fault tolerant memory system constructed according to the principles of the present invention.
Figure 4:
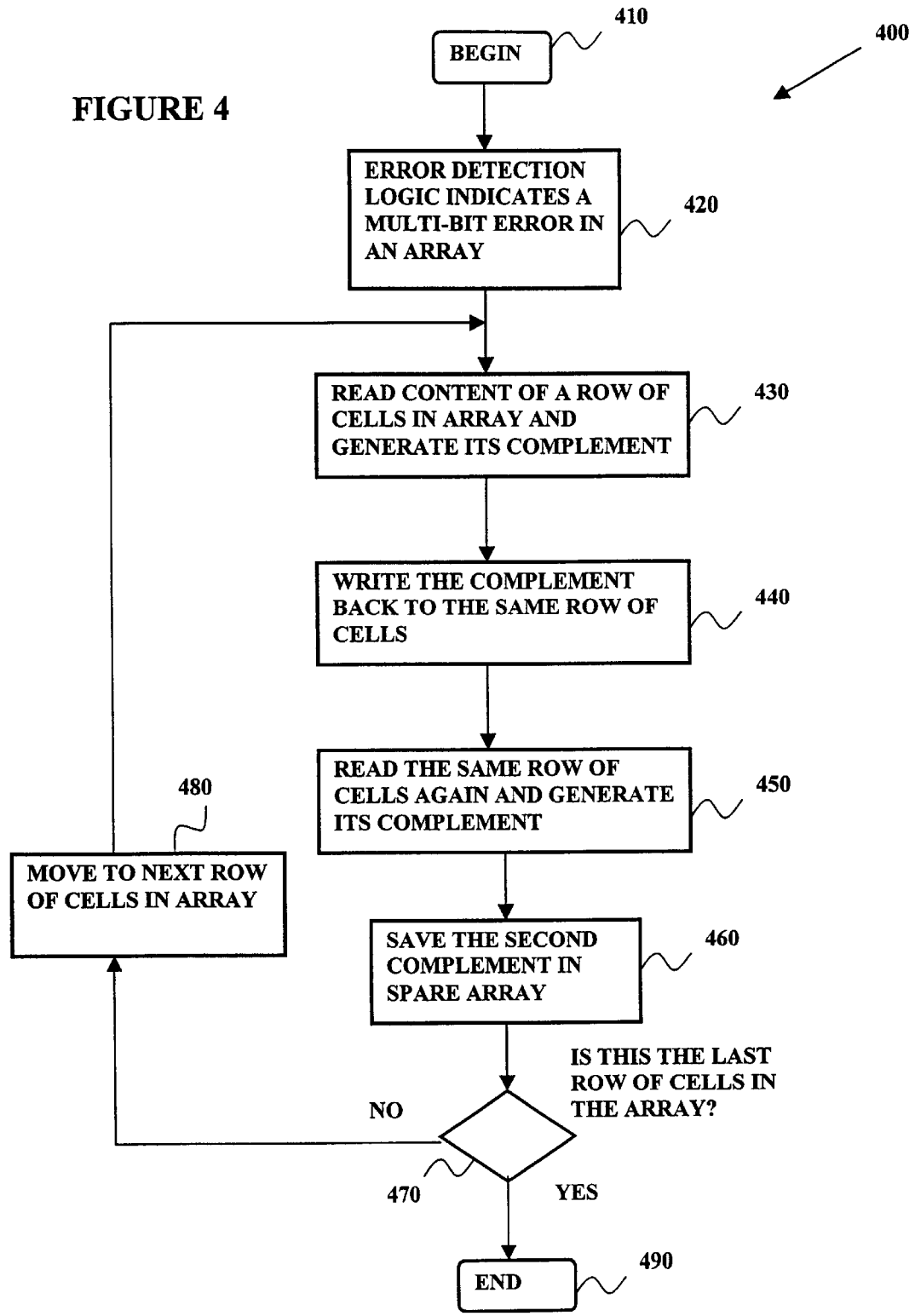
FIG. 4 illustrates a high-level process flow of an embodiment of a error detection and correction scheme according to the principles disclosed by the present invention.

Referring now to FIG. 3, there is depicted a simplified block diagram of an embodiment of a fault tolerant memory system 300 constructed according to the principles of the present invention. Fault tolerant memory system 300 includes a plurality of memory arrays, generally designated 310a–310i, that are coupled to a corresponding address decoder 320 that is utilized to selectively couple a desired stored data word location identified by a specific row and column in memory arrays 310a–310i to a data gating logic 330. Although not shown, data gating logic 330 includes failure detection logic and correction logic (analogous to error and detection logic 230 depicted in FIG. 2) incorporating SEC/DED/SPD and R/C/W/R/C logic, respectively. Fault tolerant memory system 300 also includes a spare memory array 360 that, in an advantageous embodiment, is similar in size and construction to memory arrays 310a–310i. Spare memory array 360 is coupled to data gating logic 330 and a replacement circuit 335 that includes a comparator 350 and a register 340. The number of spare memory arrays utilized in fault tolerant memory system 300 is generally determined by the number of memory array failures expected during the expected life of the system employing fault tolerant memory system 300 that may cause multi-bit errors in memory system words. It should be noted that each spare memory array will typically have its own associated register, such as register 340, and gating and degating logic so that all the inplace spare memory arrays may be utilized. Furthermore, the field maintenance strategy and field cost versus design complexity considerations may also determine the number of inplace spare memory arrays utilized in memory system 300.

The utilization of the fault tolerant system of the present invention will hereinafter be described in greater detail with respect to FIG. 4 that illustrates a high-level process flow 400 of an embodiment of a error detection and correction scheme according to the principles disclosed by the present invention. Process 400 is initiated, as depicted in step 410, when a memory array, e.g., memory array 310a (analogous to first memory array 212a), incurs a hard error that results in, e.g., two bits in first data word 212a being stuck at "1." Next, when a read operation directed to first data word 212a is initiated, SEC/SPD logic in error detection and correction logic 230 will detect the error in first data word 212a, as illustrated in step 420, and identify the memory array that has failed. Following the detection of the corrupted first data word 212a, the correction logic, i.e., R/C/W/R/C logic, in error detection and correction logic 230 will initiate a data restoration process. As depicted in step 430, process 400 begins by reading the contents beginning with the first row of cells in the failed memory array; in this case, memory array 310a. The read data is then inverted, i.e., complemented. The resulting complemented data is then written back to the first row of cells, as illustrated in step 440. The complemented data in the first row of cells are again read and another inverting operation is performed to generate a second complement of the data stored in the first row of cells, as depicted in step 450.

The resulting recomplemented data following the second inverting operation will be the correct data, even if the two stuck bits causing the memory array failure are present in the first row of cells. Following the second inverting operation, the recomplemented data is then written to the first row of cells in spare memory array 360, as illustrated in step 460.

Next, as depicted in decisional step 470, process 400 determines if the contents in all of the row of cells in memory array 310a have been subjected to the data correction, i.e. R/C/W/R/C logic, scheme. If process 400 determines that the last read row of cells is not the last row of cells in memory array 310a, the data restoration process is repeated beginning at step 430 for the next row of cells in memory array 310a, as illustrated in step 480. On the other hand, if process 400 determines that all the row of cells in the failed memory array have been read and the resulting "restored" data have been saved in spare memory array 360, process 400 is terminated, as depicted in step 490.

Following the completion of process 400, the address of the failed memory array is saved in register 340. Subsequently, prior to accessing a memory array for a read or write operation, the address of the desired memory array is compared with the saved failed memory array address in register 340 utilizing comparator 350. In the event that the two addresses match, the address of spare memory array 360 will be substituted for the failed memory array address. Consequently, any read or write operation directed to the failed memory array will be redirected to spare memory array 360 instead.

In another advantageous embodiment, error detection and correction process 400 may be implemented in a data processing system employing the fault tolerant memory system disclosed by the present invention and programmed to execute the method described hereinabove. Accordingly, in an advantageous embodiment, sets of instructions for executing the method disclosed herein are resident in RAM of one or more of the data processing system. These instructions may reside in various types of signal-bearing media. In this respect, one aspect of the present invention concerns a programmed product that includes signal-bearing media tangibly embodying a program of machine-readable instructions executable by a digital data processor to perform the error and detection method described above. The present invention does not contemplate limiting its practice to any particular type of signal-bearing media, i.e., computer readable medium, utilized to actually carry out the distribution. Examples of signal-bearing media includes recordable type media, such as floppy disks and hard disk drives, and transmission type media such as digital and analog communication links and wireless. In other advantageous embodiments, the computer program product may also be stored at another computer and transmitted to a user's computer system by an internal or external communication network, e.g., LAN or WAN, respectively.

While the invention has been particularly shown and described with reference to a preferred embodiment, it will be understood by those skilled in the art that various changes in form and detail may be made therein without departing from the spirit and scope of the invention.

What is claimed is:

1. A method for providing a fault tolerant memory system utilizing a data word organization of greater than 4 bits, said memory system having a plurality of memory arrays including at least one spare memory array, said method comprising:

(a) detecting a multi-bit error in a word in a memory array having a plurality of rows of cells;
   (b) reading content of entire row of cells in said memory array and generating a first complement of said content;
   (c) writing said first complement back to said row of cells;
   (d) reading said first complement from said memory array and generating a second complement of said first complement;
   (e) writing said second complement to a respective row of cells in said spare memory array; and
   (f) repeating (b) through (e) for each other row of cells in said memory array.

2. The method as recited in claim 1, further comprising replacing said memory array with said spare memory array.

3. The method as recited in claim 2, wherein said replacing said memory array with said spare memory array includes saving the address of said memory array in a register.

4. The method as recited in claim 3, wherein said replacing said memory array with said spare memory array further includes:

comparing the address of said memory array with a memory array address of a memory access operation; and
   directing said memory access operation to said spare memory array in response to said address of said memory array being equal to said memory array address of said memory access operation.

5. The method as recited in claim 1, wherein said detecting a multi-bit error includes utilizing a single package detect (SPD) logic for detecting said multi-bit error in said memory array.

6. The method as recited in claim 1, wherein said plurality of memory arrays are dynamic random access memory (DRAM) devices.

7. The method as recited in claim 4, wherein said comparing the address of said memory array with a memory array address of a memory access operation includes utilizing a comparator.

8. The fault tolerant memory system as recited in claim 5, wherein means for identifying a failed memory array includes utilizing a single package detect (SPD) logic for detecting said failed array.

9. A fault tolerant memory system for use in a data processing system utilizing a data word organization of greater than 4 bits, said fault tolerant memory system comprising:

a plurality of memory arrays including at least one spare memory array;
   means for detecting a multi-bit error in a word in a memory array having a plurality of rows of cells;
   means for correcting data stored in said failed memory array, wherein said means for correcting data stored in said failed memory array includes:
   means for reading content of an entire row of cells in said failed memory array and generating a first complement of said content;
   means for writing said first complement back to said row of cells; and
   means for reading said first complement from said failed memory array and generating a second complement of said first complement; and
   means for repetitively employing said correcting means for each other row of cells in said memory array; and means for replacing said failed memory array with a spare memory array.

10. The fault tolerant memory system as recited in claim 8, wherein said means for correcting data stored in said failed memory array further includes writing said second complement to a row of cells in said spare memory array.

11. The fault tolerant memory system as recited in claim 8, wherein said plurality of memory arrays are dynamic random access memory (DRAM) devices.

12. The fault tolerant memory system as recited in claim 8, wherein said means for replacing said failed memory array includes saving the address of said failed memory array in a register.

13. A computer program product, comprising:

a computer-readable medium having stored thereon computer executable instructions for implementing a method for providing a fault tolerant memory system utilizing a data word organization of greater than 4 bits, said memory system having a plurality of memory arrays including at least one spare memory array, said computer executable instructions when executed, perform the steps of:

a) detecting a multi-bit error in a word in a memory array having a plurality of rows of cells;
   b) reading content of an entire row of cells in said memory array and generating a first complement of said content;
   (c) writing said first complement back to said row of cells;
   (d) reading said first complement from said memory array and generating a second complement of said first complement;
   (e) writing said second complement to a respective row of cells in said spare memory array; and
   (f) repeating (b) through (e) for each other row of cells in said memory array.

14. The computer program product as recited in claim 13, further comprising instructions for replacing said memory array with said spare memory array.

15. The computer program product as recited in claim 14, wherein said instructions for replacing said memory array with said spare memory array includes instructions for saving the address of said memory array in a register.

16. The computer program product as recited in claim 15, wherein said replacing said memory array with said spare memory array further includes:

comparing the address of said memory array with a memory array address of a memory access operation; and
   directing said memory access operation to said spare memory array in response to said address of said memory array being equal to said memory array address of said memory access operation.

17. The computer program product as recited in claim 13, wherein said detecting a multi-bit word error includes utilizing a single package detect (SPD) logic for detecting said memory array.

18. The computer program product as recited in claim 13, wherein said plurality of memory arrays are dynamic random access memory (DRAM) devices.

19. A method for providing a fault tolerant memory system utilizing a data word organization of greater than 4 bits, said memory system having a plurality of dynamic access random access memory arrays including at least one spare memory array, comprising:

(a) detecting a multi-bit word error in a memory array, wherein said detecting includes utilizing a single package detect (SPD) logic for detecting said memory array;

(b) reading content of a first row of cells in said memory array and generating a first complement of said content;

(c) writing said first complement back to said first row of cells;

(d) reading said first complement from said memory array and generating a second complement of said first complement;

(f) replacing said memory array with said spare memory array, wherein said replacing said memory array with said spare memory array includes saving the address of said memory array in a register, comparing, with a comparator, the address of said memory array with a memory array address of a memory access operation, and directing said memory access operation to said spare memory array in response to said address of said memory array being equal to said memory way address of said memory access operation;

(g) writing said second complement to a first row of cells in said spare memory array; and (h) repeating (b) through (g) for all rows of cells in said memory array.

* * * * *